United States Patent [19]

Olds et al.

[11] Patent Number: 4,667,197
[45] Date of Patent: May 19, 1987

[54] TRANSPONDER OUTPUT AMPLITUDE MODULATION CONTROL

[75] Inventors: Keith A. Olds, Mesa; Richard L. Ward, Phoenix, both of Ariz.

[73] Assignee: Motorola, Inc., Schaumburg, Ill.

[21] Appl. No.: 812,483

[22] Filed: Dec. 23, 1985

[51] Int. Cl.⁴ ............................................. G01S 13/74
[52] U.S. Cl. .................................................... 342/51
[58] Field of Search ................... 342/51, 175; 455/67; 375/99

[56] References Cited

U.S. PATENT DOCUMENTS

| | | |
|---|---|---|
| 3,158,818 | 11/1964 | Plumpe . |
| 3,684,962 | 8/1972 | Hottel, Jr. . |
| 4,075,632 | 2/1978 | Baldwin et al. ........................ 342/51 |
| 4,090,196 | 5/1978 | Stevenson, Jr. . |
| 4,213,129 | 7/1980 | Kennedy et al. ....................... 342/51 |
| 4,263,560 | 4/1981 | Ricker . |
| 4,278,977 | 7/1981 | Nossen ................................... 342/42 |

Primary Examiner—Thomas H. Tarcza
Assistant Examiner—Donald E. Hayes, Jr.
Attorney, Agent, or Firm—Eugene A. Parsons

[57] ABSTRACT

In a radar enhancing transponder, apparatus for determining the percent of modulation on a received signal and apparatus for determining the percent of modulation on a signal transmitted by the transponder, with means for comparing the percentages to develope an error signal which is used to control the modulation in the transponder so that the percent of modulation on the return signal remains the same as that on the received signal.

9 Claims, 3 Drawing Figures

TRANSPONDER OUTPUT AMPLITUDE MODULATION CONTROL

BACKGROUND OF THE INVENTION

The present invention pertains to a radar enhancing transponder and particularly to a transponder for use with a radar in which the transmitted signal is amplitude modulated and the percent of modulation is the desired or useful information which must be retransmitted to the radar. In particular, such radars are included in landing systems wherein the radar incorporates conical scan angle tracking transponder located on the airplane attempting to land receives a signal on which the amount of modulation is dependent upon the distance the airplane is from the center of the conical scan. In this system the percent of modulation, rather than a specific amount of amplitudemodulation, is the critical characteristic which provides the desired information. Thus, it is important that the reply signal transmitted by the transponder on the airplane has the correct percentage of modulation.

Insuring that the reply signal transmitted by the transponder has the correct percentage of modulation thereon is further complicated by the fact that the reply signal is generally transmitted at a different frequency than the signal received from the radar. For example, the radar signal may lie in the Ka band of frequencies while the reply signal may lie in the X band.

In the present transponders the modulation of the reply signal is accomplished by striping the modulation signal off of the received signal, and using it to drive a modulator in the transponder. This is an open loop approach to reproducing the received modulation signal on the reply signal. An automatic gain control amplifier is used in the receiver to maintain a near constant signal amplitude at the input to a modulation detector. The circuit which recovers the modulation from the received signal does not measure percent modulation. If the AGC amplifier in the receiver were perfect, it could be argued that the recovered modulation signal is a measure of percent modulation, but this is obviously not the case. Further, the modulator which modulates the reply signal does not always convert its drive signal into a correct modulation of the X band signal. The device used to modulate the X band signal is a pin diode attenuator. Pin diodes are nonlinear, and the attenuation versus drive signal amplitude varies widely from unit to unit. Further, the X band power produced by the transponder can vary by at least a factor of two from unit to unit. Since there is no way to compensate for this variation between units, it can potentially produce a significant difference between the received and output percentage modulation.

SUMMARY OF THE INVENTION

The present invention is a radar enhancing transponder including a receiver for receiving a transmitted radar signal having modulation thereon, apparatus for determining the percent of modulation on the received radar signal, a transmitter controllably modulated for transmitting a reply signal, apparatus for determining the percent of modulation on the transmitted reply signal, apparatus for comparing the percent of modulation on the transmitted reply signal to the percent of modulation on the received radar signal and developing an error signal which is utilized to control the modulation on the transmitted reply signal so that the percent of modulation thereon is substantially equal to the percent of modulation on the received radar signal.

It is an object of the present invention to provide a new and improved output amplitude modulation control for radar enchancing transponders. It is a further object of the present invention to provide a method of controlling modulation in the transmitter of a transponder so that the percent of amplitude modulation on a transmitted response signal is equal to the percent of amplitude modulation on a received signal.

These and other objects of this invention will become apparent to those skilled in the art upon consideration of the accompanying specification, claims, and drawings.

BRIEF DESCRIPTION OF THE DRAWINGS

Referring to the drawings.

DESCRIPTION OF THE PREFERRED EMBODIMENT

Figure 1:
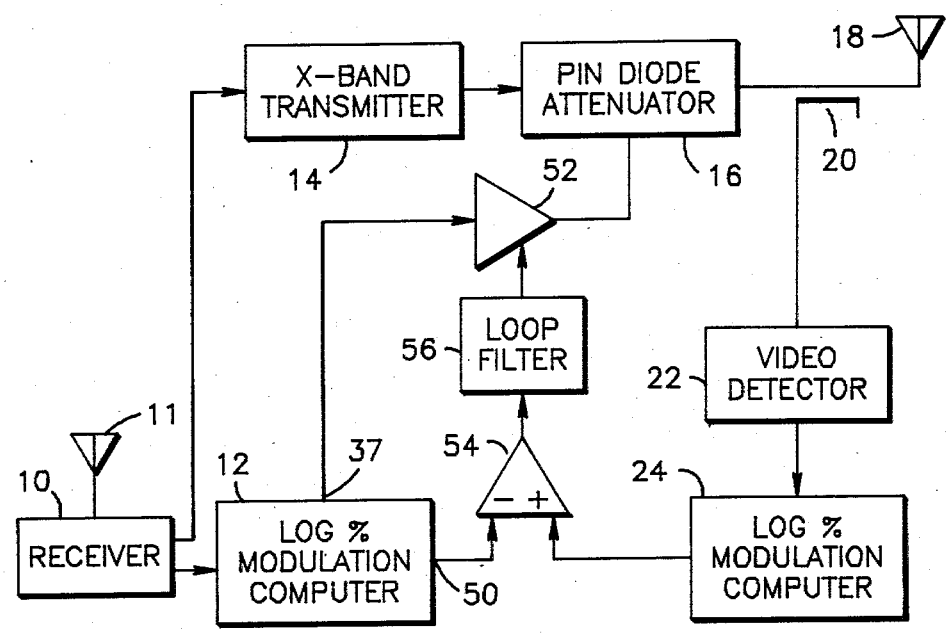
FIG. 1 is a block diagram of a radar enchancing transponder emobodying the present invention.

Referring specifically to FIG. 1, the block diagram of a radar enchancing transponder embodying the present invention is illustrated. In this particular embodiment a receiver 10 receives signals, by way of an antenna 11, from a remote radar which is transmitting in the Ka band. The received signals are amplitude modulated with the modulation providing certain desired information. After amplifying and detecting, as is well-known in the art, the receiver 10 provides a video signal to a log percent modulation computer 12.

A transmitter 14 is designed to respond to signals received at receiver 10 by transmitting a responsive signal in the X band. RF signals from transmitter 14 are supplied to a PIN diode attenuator 16 or other electronically controlled attenuator device which, through attenuation, provides an amplitude modulation on the RF signals supplied thereto. The modulated RF signals from attenuator 16 are supplied to an antenna 18. It will, of course, be understood by those skilled in the art that in many applications the receiving antenna 11 and the transmitting antenna 18 will be the same antenna. Further, while receiver 10 and transmitter 14 are operating on different frequencies, in many transponders these components will operate on the same frequency.

A portion of the modulating RF signal supplied to transmitter 18 by attenuator 16 is sensed by a directional coupler 20 and suplied to a video detector 22. Video detector 22, as in receiver 10, amplifies and detects the signal to supply a video signal to an input of a log percent modulation computer 24, which computer is similar to computer 12. A more detailed block diagram of computer 12 is illustrated in FIG. 2.

Figure 2:
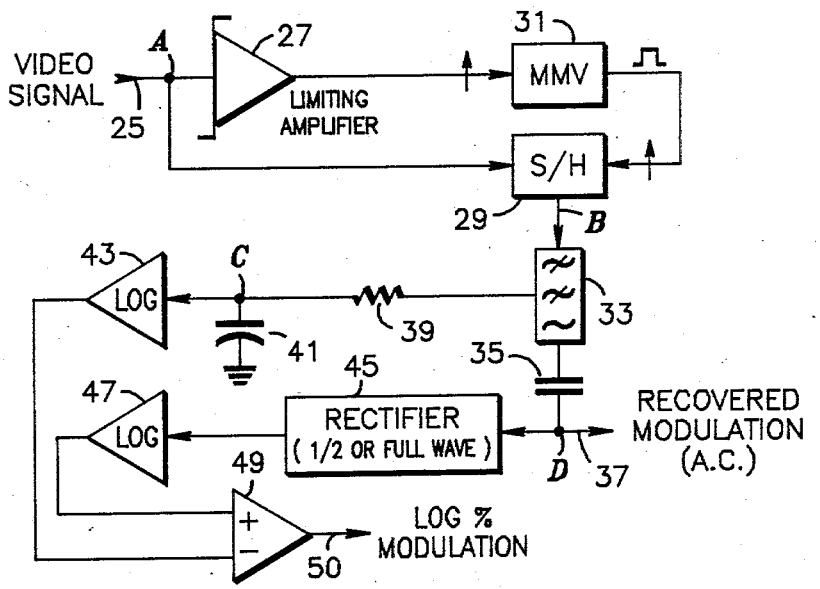
FIG. 2 is a more detailed block diagram of a portion of FIG. 1.
Figure 3:
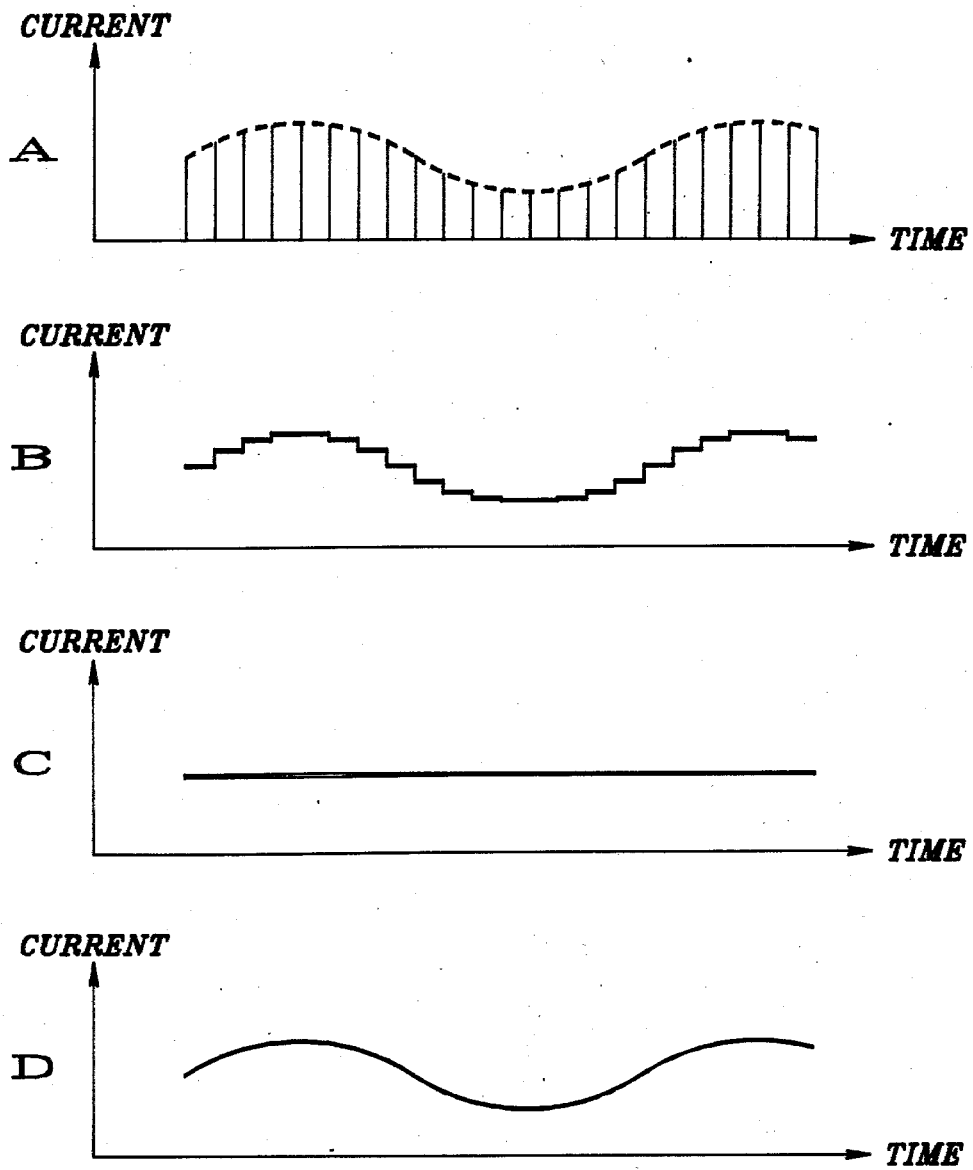
FIG. 3 illustrates various waveforms available at different points in FIG. 2.

Referring specifically to FIG. 2, an input terminal 25 is adapted to receive the video signal from receiver 10. The video signal from terminal 25 is supplied to the input of a limiting amplifier 27 and to the signal input of a sample and hold circuit 29. The video signal from receiver 10 consists of a series of pulses varying in amplitude in accordance with the modulation applied thereto. An example of a typical input video signal is illustrated in FIG. 3, waveform A. The limiting amplifier 27 amplifies and limits the signal so that the amplitude modulation is removed therefrom and only the pulses are available at the output. The pulse output from limiting amplifier 27 is applied to the input of a monostable multivibrator 31 which provides properly shaped gating pulses at the same frequency as the pulses of the video signal supplied to terminal 25. The gating pulses from monostable multivibrator 31 are supplied to a gating input of sample and hold circuit 29. Thus, sample and hold circuit 29 samples each pulse in the waveform supplied to input terminal 25 and holds the amplitude thereof until the next pulse. Sample and hold circuit 29 converts the input video signal to a unipolar continuous wave signal, an example of which is illustrated in FIG. 3, waveform B. A variety of alternate peak detect and hold circuits could be used in this application.

The unipolar continuous wave signal from sample and hold circuit 29 is supplied to a bandpass filter 33 which filters and smooths the signal into the original modulation signal. A coupling and DC blocking capacitor 35 passes the recovered modulation signal to an output terminal 37. Thus, the signal available at terminal 37 is the detected modulation signal with all DC components removed, an example of which is illustrated in FIG. 3, waveform D.

Filter 33 also supplies the smoothed continuous wave signal through a resistor 39 to one terminal of a capacitor 41, the other terminal of which is grounded. Resistor 39 and capacitor 41 operate as an integrator and provide a signal, which is the DC average of the recovered modulation (illustrated in FIG. 3, waveform C), to the input of a logarithmic amplifier 43. The recovered modulation signal from capacitor 35 is also rectified in a rectifier 45 and supplied to the input of a second logarithmic amplifier 47. The logarithm of the recovered modulation supplied by amplifier 47 is connected to the positive input of a combining circuit 49, which in this embodiment is a differential amplifier. The logarithm of the DC average of the modulation signal from amplifier 43 is applied to the negative input of combining circuit 49 and, therefore, is subtracted from the logarithm of the recovered modulation. Substracting the logarithm of the DC average from the logarithm of the recovered modulation is the same as dividing the recovered modulation signal by the DC average, so that the output signal from circuit 49 is the logarithm of the percent of modulation on the video signal applied to input terminal 25. The logarithm of the percent of modulation signal is available at an output terminal 50.

While the computer illustrated in FIG. 2 has been explained in conjunction with computer 12 of FIG. 1, it will be understood by those skilled in the art that a similar computer may be used as computer 24 of FIG. 1 with the recovered modulation output 37 not being utilized.

Referring to both FIGS. 1 and 2, the recovered modulation output 37 of computer 12 is supplied to a signal input of a controlled gain amplifier 52. The output of amplifier 52 is supplied to a control input of PIN diode attenuator 16. The output of amplifier 52 controls PIN diode attenuator 16 to alter the amount of modulation on the RF signal from transmitter 14.

The logarithm of the percent of modulation on output terminal 50 of computer 12 is supplied to the negative or substracting input of a differential amplifier 54. The logarithm of the percent of modulation on the transmitted signal from attenuator 16, which is available at the output of computer 24, is supplied to the positive input of differential amplifier 54. Thus, the percent of modulation on the received signal is compared to the percent of modulation on the responsive signal in differential amplifier 54 and the difference, or error signal is supplied through a loop filter 56 to a control input of controlled gain amplifier 52.

In the operation of the modulation control circuit, the percent of modulation on the received signal is compared to the percent of modulation on the transmitted responsive signal and any differences are utilized to control the gain of amplifier 52. Amplifier 52 will operate normally at some nominal gain generally in the center of its range. Thus, the filtered error signal from differential amplifier 54 can control amplifier 52 to increase or decrease the gain and, thereby, increase or decrease the attenuation produced by PIN diode attenuator 16.

Thus, improved amplitude modulation control apparatus for a radar enhancing transponder is illustrated wherein the percent of modulation on a transmitted response signal is substantially similar to the percent of modulation on a received signal. Because the modulation and the percent of modulation are maintained substantially similar on the transmitted response signal and the received signal, the response at the radar is very accurate and does not contain any of the errors introduced in prior art transponders. Further, 35 the present amplitude modulation control apparatus is relatively simple and inexpensive to manufacture, and may be added to present apparatus since major components, such as the receiver, transmitter, and attenuator are not altered.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A radar enhancing transponder for use with a radar in which the transmitted signal is modulated and the percent of modulation is desired information, said transponder comprising:

a receiver for receiving a transmitted radar signal having modulation thereon and providing a first output video signal modulated in accordance with the received signal;

first modulation computer means, connected to said receiver to have applied thereto the first output video signal, for providing a detected modulation signal and a first output signal indicative of the logarithm of the percent of modulation on the first output video signal;

controlled means having a signal input connected to receive the first output signal from said first modulation computer means, a control input, and an output;

a transmitter including a modulator with a modulating signal input and a transmitter output;

pick-off and detector means coupled to the transmitter output for providing a second output video signal modulated in accordance with a transmitted signal from said transmitter;

second modulation computer means, connected to said pick-off and detector means to have applied thereto the second output video signal, for providing a second output signal indicative of the logarithm of the percent of modulation on the second output video signal;

combining means having first and second inputs connected to have applied thereto the first and second output signals, respectively, of said first and second modulating computer means for substracting the first output signal from the second output signal and supplying a difference signal at an output thereof; and connecting means coupling the difference signal from said combining means to the control input of said controlled means.

2. A radar enchancing transponder as claimed in claim 1 wherein the first and second modulation computer means each include sample and hold means for converting the applied output video signals to a continuous wave signal representative of a video modulation envelope, filter means for separating the continuous wave signal into a recovered modulation signal and a DC signal representative of the average of modulation, first and second logarithmic amplifiers connected to receive the recovered modulation signal and the DC signal, respectively, and providing first and second output signals, respectively, representative of the logarithm of the recovered modulation signal and the logarithm of the DC signal, and combining means connected to receive the first and second output signals from said first and second logarithmic amplifiers for substracting the signals to provide an output signal indicative of the logarithm of the percent of modulation.

3. A radar enhancing transponder as claimed in claim 1 wherein the controlled means includes a gain controlled amplifier.

4. A radar enhancing transponder as claimed in claim 1 wherein the combining means includes a differential amplifier.

5. A radar enhancing transponder as claimed in claim 1 wherein the modulator in the transmitter includes a PIN diode attenuator.

6. In a radar enhancing transponder, the method of modulating the output signal at substantially the same percent of modulation as a received signal, comprising the steps of:

receiving a radar signal having modulation thereon;
determining the logarithm of the percent of modulation on the received signal;
providing a detected modulation signal;
transmitting a signal controllably modulated with the detected modulation signal;
sensing the modulation on the transmitted signal;
determining the logarithm of the percent of modulation on the sensed transmitted signal;
substracting the logarithm of the percent of modulation on the received signal from the logarithm of the percent of modulation on the transmitted signal to provide a logarithmic percent modulation error signal; and
controlling the percent of modulation of the transmitted signal, using the logarithmic percent modulation error signal, to cause the percent of modulation on the transmitted signal to be substantially equal to the percent of modulation on the received signal.

7. In a radar enhancing transponder, the method set forth in claim 6 wherein the step of determining the logarithm of the percent of modulation on the received signal includes the steps of: providing a modulated video signal from the received radar signal, sampling and holding the modulated video signal to provide a continuous wave signal, filtering the continuous wave signal to provide a detected modulation signal and a DC signal representative of the average modulation, amplyfing the detected modulation signal and the DC signal in logarithmic amplifiers to produce logarithms of the signals, and substracting the logarithm of the DC signal from the logarithm of the detected modulation signal to provide a logarithm of the percent of modulation on the received signal.

8. In a radar enhancing transponder, the method set forth in claim 6 wherein the step of determining the logarithm of the percent of modulation on the sensed transmitted signal includes the steps of: detecting the sensed modulation on the transmitted signal to provide a video signal, sampling and holding the video signal to provide a continuous wave signal, filtering the continuous wave signal to provide a detected modulation signal and a DC signal representative of the average modulation, amplifying the detected modulation signal and the DC signal in logarithmic amplifiers to produce logarithms of the signals, and subtracting the logarithm of the DC signal from the logarithm of the detected modulation signal to provide a logarithm of the percent of modulation on the sensed transmitted signal.

9. In a radar enhancing transponder, the method of modulating a transmitted reply signal at substantially the same percent of modulation as is present on a received signal, comprising the steps of:

receiving a radar signal having modulation thereon;
determining the percent of modulation on the received radar signal;
transmitting a controllably modulated reply signal;
determining the percent of modulation on the transmitted reply signal;
comparing the percent of modulation on the transmitted reply signal to the percent of modulation on the received radar signal and developing an error signal representative of the difference; and
utilizing the error signal to control the modulation on the transmitted reply signal so that the percent of modulation thereon is substantially equal to the percent of modulation on the received radar signal.

* * * * *